United States Patent [19]

Green

[11] Patent Number: 5,039,207
[45] Date of Patent: Aug. 13, 1991

[54] LIQUID CRYSTAL DISPLAY DEVICE WITH PRISMATIC LIGHT TRANSMITTING MEMBER

[75] Inventor: Bernard J. Green, Harrow, England
[73] Assignee: Thorn Emi plc, London, England
[21] Appl. No.: 380,467
[22] Filed: Jul. 17, 1989
[30] Foreign Application Priority Data Jul. 15, 1988 [GB] United Kingdom ................ 8816952

[51] Int. Cl.⁵ .................................................. G02F 1/13
[52] U.S. Cl. ........................................ 359/49; 359/50; 359/70/
[58] Field of Search ................ 350/345, 258, 259, 260, 350/261, 262, 263, 264, 265, 338; 362/31, 32, 26, 27, 219, 217

[56] References Cited

U.S. PATENT DOCUMENTS

| | | | |
|---|---|---|---|
| 3,497,686 | 2/1970 | Young | 240/1 |
| 3,863,246 | 1/1975 | Trcka et al. | 350/345 |
| 4,386,826 | 6/1983 | Stolov | 350/345 |

FOREIGN PATENT DOCUMENTS 0172615 2/1986 European Pat. Off. .

OTHER PUBLICATIONS

"Backlighting for Liquid Crystal Display"–IBM Technical Disclosure Bulletin, vol. 29, No. 11, Apr. 1987, pp. 4838–4839.
Machine Design, vol. 31, No. 22, 10/59, pp. 94–103, Blumenfeld et al.

Primary Examiner—Rolf Hille
Assistant Examiner—S. V. Clark
Attorney, Agent, or Firm—Fleit, Jacobson, Cohn, Price, Holman & Stern

[57] ABSTRACT

A liquid crystal device comprises backlighting means to provide illumination from the rear for a liquid crystal panel. The backlighting means has a layer of light-transmitting material formed with a prismatic region at one edge and a plurality of light sources of differing chromatic output, located adjacent the prismatic region.

10 Claims, 1 Drawing Sheet

U.S. Patent    Aug. 13, 1991    5,039,207
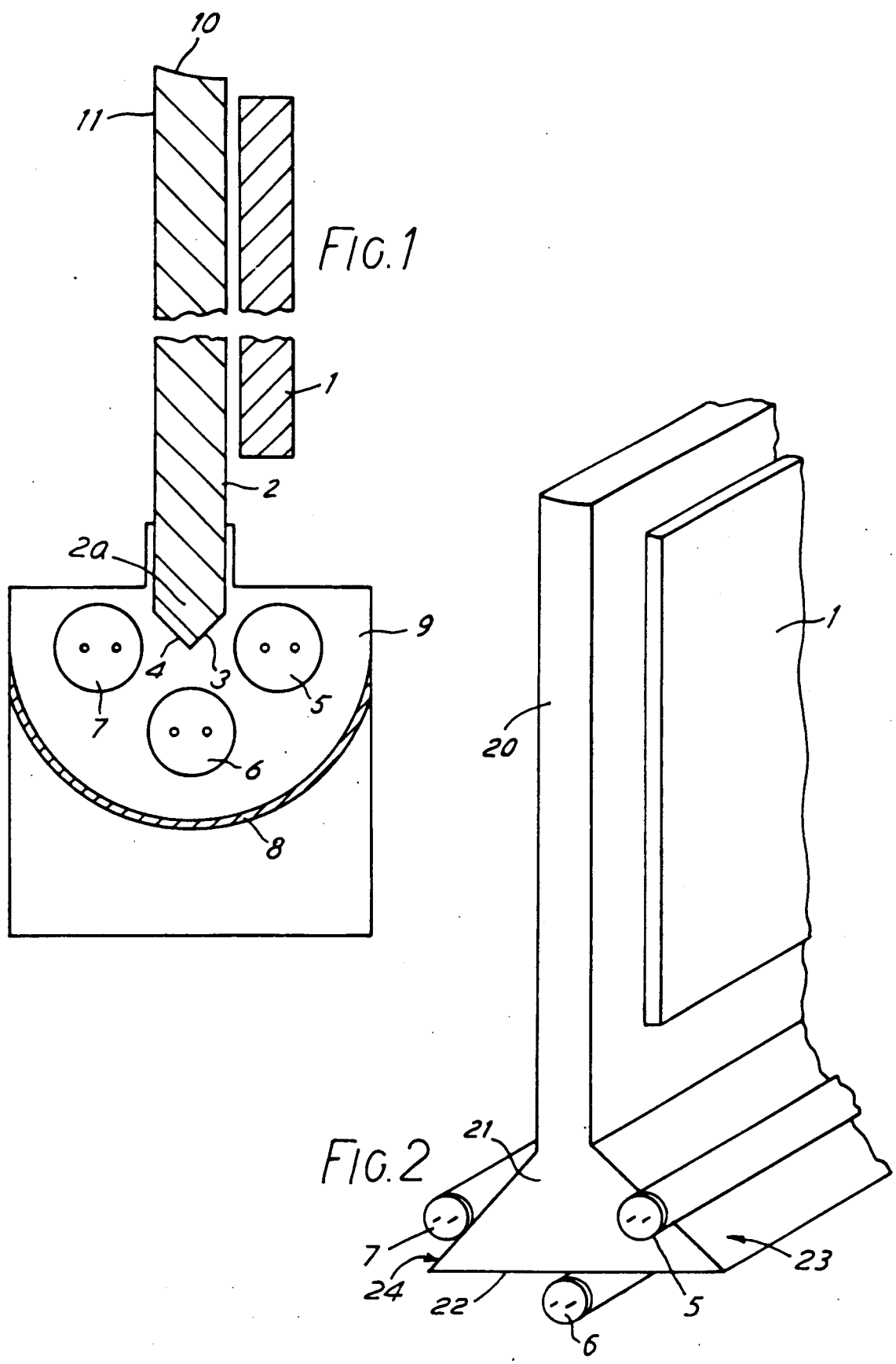

LIQUID CRYSTAL DISPLAY DEVICE WITH PRISMATIC LIGHT TRANSMITTING MEMBER

The present invention relates to the backlighting of a liquid crystal device.

A known liquid crystal display has three fluorescent lamps of different colours which in operation are sequentially switched to give fields of the three primary colours during each display frame. A planar array of the three coloured lamps tends to provide non-uniform illumination of the liquid crystal panel, in which the area in front of each lamp is more illuminated by that lamp; attempts to remedy this problem, for example by effective light-scattering layers, require the backlighting apparatus to be substantially thicker and hence a major factor in the overall thickness of the display.

An object of the present invention is to provide improved uniformity of back-illumination.

Another object of the present invention is to provide a thin back-illumination unit.

The present invention provides a liquid crystal device comprising backlighting means to provide illumination from the rear, for a liquid crystal panel, the backlighting means having a layer of light-transmitting material formed with a prismatic region at one edge and a plurality of light sources, of differing chromatic output, located adjacent the prismatic region.

The prismatic region enables each of the plurality of light sources to input light efficiently into the backlighting means and so to provide improved uniformity of illumination of different colours.

Preferably, the backlighting means comprises a planar section with two faces extending from an edge of the planar section and meeting at an apex to define an acute angle therebetween to form the prismatic region.

In another preferred embodiment, the backlighting means comprises a main planar section and an elongate member extending from one edge of the planar section, the member having a cross-section, perpendicular to the major plane of the backlighting means, which is of triangular shape whose base is substantially parallel to the edge of the backlighting means from which the member extends and is remote from the planar section.

Preferably the backlighting means comprises a sheet of light-transmitting material integral with the prismatic region, and formed for example by casting or molding, optionally with appropriate additional abrading or cutting.

In order that the invention may more readily be understood, a description is now given by way of example only, reference being made to the accompanying drawings, in which:

FIG. 1 is a cross-sectional view of part of a display embodying the present invention; and FIG. 2 is a perspective view of part of another display embodying the present invention.

In FIG. 1, a liquid crystal display panel 1 has a backlight plate 2 formed of a perspex sheet of dimensions 145 mm×33 110 mm and 15 mm thickness which has, at one edge, two faces 3 and 4 which meet at an apex to define an angle of 45°, thereby forming a prism 2a. Other light transmitting materials which may be used include glass (though this is relatively heavy), clear polystyrene, polycarbonate and transparent acrylic. Three fluorescent tubes 5, 6 and 7 (to output red light, green light and blue light respectively) of diameter about 15 to 16 mm are located adjacent the faces 3 and 4 such that the longitudinal axes of the tubes lie on a cylindrical plane centred on the apex and with a radius of approximately 15 mm (but which may be dependent on the diameter of the tubes 5, 6, 7); the axes of tubes 5 and 7 are diametrically opposite on the cylindrical plane, while the axis of tube 6 is half-way between them on the cylindrical plane. Thus, each of the tubes 5, 6 and 7 can input light into plate 2 efficiently and such as to provide substantially the same illumination of the panel 1. An aluminum sheet of semi-cylindrical shape having a radius of curvature of about 30 mm and painted white internally acts as a reflector 8 common to all the tubes. An end cap 9 of a suitable plastics material (for example ptfe or polythene) is located at, and engages with, each end of reflector 8; the end cap 9 also engage with the plate 2 and the ends of the tubes to ensure their correct relative positioning.

Edge 10 of plate 2 has a concave curvature (arc radius of 36 mm) and a mirror coating such as to direct light, emanating from the tubes, onto the back surface 11 of plate 2 which has multiple coats of white enamel paint to provide effective diffuse forward reflection of light. A coating of aluminium may be provided on the white coating to reflect any light transmitted through the white coating back into the plate 2.

Plate 2 can be manufactured by casting or molding such as to incorporate the shapes of the faces 3 and 4 and of edge 10; alternatively, these shapes can be formed by appropriate cutting, abrading and/or other mechanical operations. The mirror surface on edge 10 can be achieved by polishing, aluminising a layer of 2000 Å and lacquering or alternatively by the application of self-adhesive aluminium tape.

FIG. 2 shows another arrangement for the back illumination of liquid crystal panel 1, the principal difference being in that the backlighting plate 20 is shaped to form, along one edge, an elongate prism 21 whose base 22 is positioned remote from the main planar section of the plate 20 adjacent panel 1. The base 22 is coated with a thin oxide film or dichroic mirror to act as a dielectric colour separating mirror so constituted that it transmits the emission from the green fluorescent tube 6 underneath it and reflects the emissions passing though the faces 23, 24 from the red and blue tubes 5 and 7 which are placed at an angle of 45° with it.

Plate 20 has an edge 10 and surface 11 as in similar fashion to those of plate 2, and can be provided with a reflector and end cap similar to those of plate 2. It is envisaged that a reflector would be provided for each tube 5, 6, 7 of the backlighting means in this embodiment.

I claim:

1. Apparatus including a plurality of light sources for backlighting a liquid crystal device comprising a light transmitting member formed with an integral prismatic region at one edge thereof, the prismatic region arranged to be receptive to light from the plurality of light sources which light sources are arranged to provide a plurality of chromatic outputs, for providing a substantially uniform illumination of the light transmitting member for each chromatic output.

2. Apparatus according to claim 1 wherein the backlighting member comprises a planar member with two major surfaces thereof and two further respective faces extending therefrom at the one edge such that each of the two further faces protrudes from one of the two major faces at an angle such that the two further faces converge to meet at an apex thereby forming the prismatic region.

3. Apparatus according to claim 1 wherein the backlighting member comprises a planar member with two major surfaces thereof and two further respective faces extending therefrom at the one edge such that each of the two further faces protrudes from one of the two major faces at an angle such that the two further faces diverge thereby to form the prismatic region, the prismatic region having a base portion which is substantially normal to the two major surfaces.

4. Apparatus according to claim 2 wherein the light sources are located adjacent to major faces of the prismatic region such that they lie on a cylindrical plane centred around the apex of the prismatic region.

5. Apparatus according to claim 2 wherein the light transmitting member has a further edge, remote from the one edge thereof, arranged to bear a light reflective coating directing light from the light sources back into the planar member.

6. Apparatus according to claim 5 wherein the further edge is arranged to have a concave curvature as viewed from outside the light transmitting member.

7. Apparatus according to claim 3 wherein the base portion is arranged to bear a coating for providing a dichroic colour separating mirror thereby to permit optical transmission of one chromatic output and to reflect all other chromatic outputs.

8. Apparatus according to claim 1 wherein the light transmitting member includes opposed major surfaces and the substantially uniform illumination of the light transmitting member for each chromatic output is arranged for emission via a major surface thereof, the liquid crystal device being arranged adjacent to the said major surface for emission of each chromatic output, whereby the light sources cannot be viewed directly through the liquid crystal device.

9. Apparatus according to claim 2 wherein the light transmitting member includes opposed major surfaces and the substantially uniform illumination of the light transmitting member for each chromatic output is arranged for emission via a major surface thereof, the liquid crystal device being arranged adjacent to the said major surface for emission of teach chromatic output, whereby the light sources cannot be viewed directly through the liquid crystal device.

10. Apparatus according to claim 3 wherein the light transmitting member includes opposed major surfaces and the substantially uniform illumination of the light transmitting member for each chromatic output is arranged for emission via a major surface thereof, the liquid crystal device being arranged adjacent to the said major surface for emission of each chromatic output, whereby the light sources cannot be viewed directly through the liquid crystal device.

* * * * *